United States Patent [19]

Hoover

[11] Patent Number: 4,676,197

[45] Date of Patent: Jun. 30, 1987

[54] FEEDER FOR HOGS AND LIKE ANIMALS

[75] Inventor: Donald R. Hoover, Milford, Ind.

[73] Assignee: CTB, Inc., Milford, Ind.

[21] Appl. No.: 786,872

[22] Filed: Oct. 11, 1985

[51] Int. Cl.$^4$ .............................................. A01K 5/02
[52] U.S. Cl. .................................. 119/52 AF; 119/54
[58] Field of Search .................. 119/52 AF, 53.5, 54, 119/51 R

[56] References Cited

U.S. PATENT DOCUMENTS

| | | | |
|---|---|---|---|
| 1,276,884 | 8/1918 | Dierks | 119/54 |
| 1,305,832 | 6/1919 | Patterson | 119/53.5 |
| 2,755,771 | 7/1956 | Martin | 119/52 AF |
| 4,401,057 | 8/1983 | Van Gilst | 119/51 R |

Primary Examiner—Hugh R. Chamblee
Attorney, Agent, or Firm—Trexler, Bushnell, Giangiorgi & Blackstone, Ltd.

[57] ABSTRACT

A hog feeder comprises a generally overhead horizontal conveyor for transporting feed to a series of drop tubes which contain centerless augers for delivering feed downwardly through the tubes to feed pans therebelow. Attached to the auger at its lower end are elements for engagement by the hogs during feeding to drive the centerless auger and thereby positively deliver feed to the feed pans. The system further includes a limit switch in the down tube of a control feeder unit located above the pan and below the horizontal conveyor for ensuring that there is always feed in the various other feeder units attached to the overhead conveyor.

12 Claims, 10 Drawing Figures

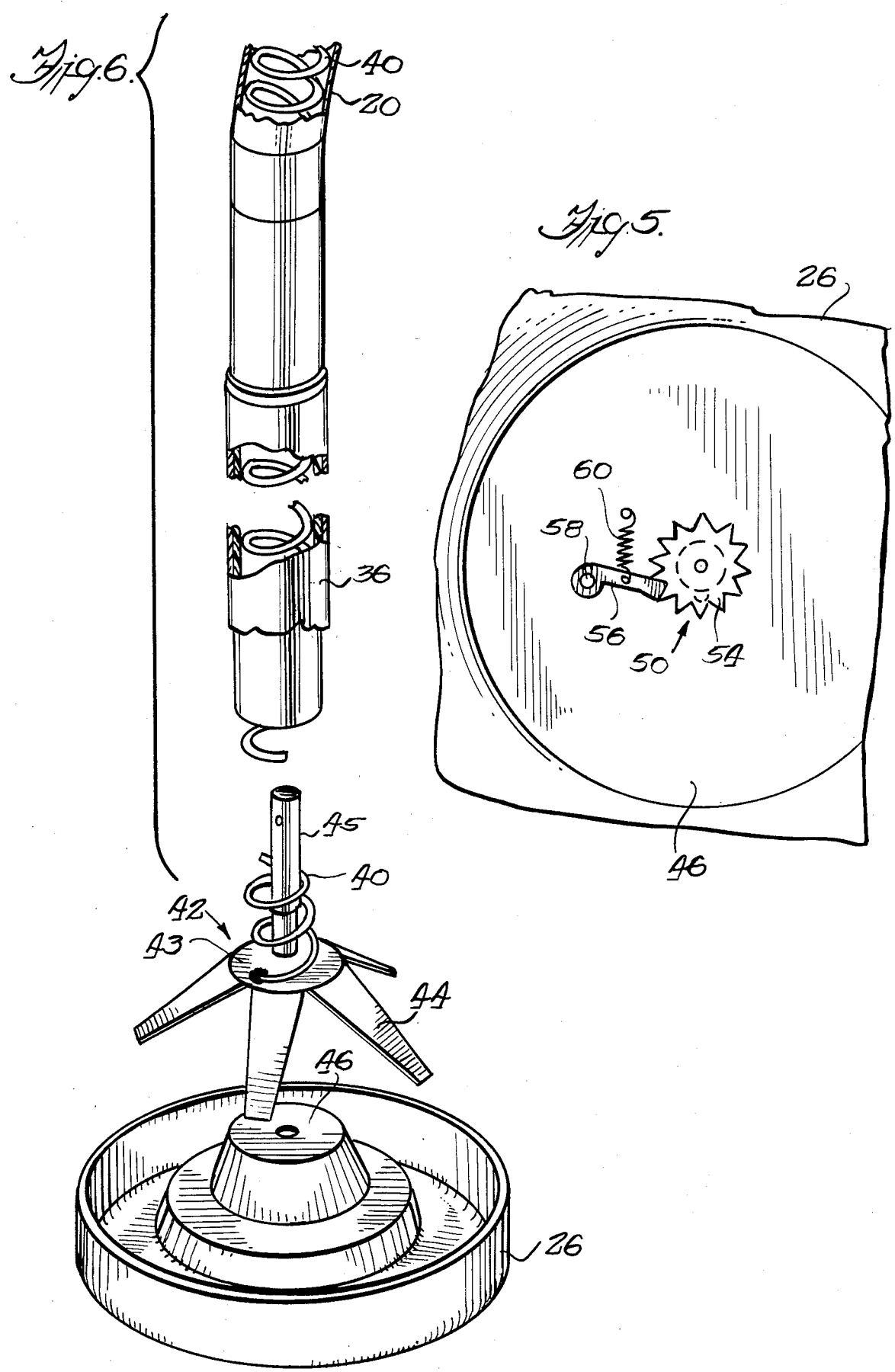

FEEDER FOR HOGS AND LIKE ANIMALS

BACKGROUND OF THE INVENTION

This invention relates generally to animal husbandry, more particularly to apparatus for feeding hogs and the like, and which is especially adapted for use in feeding hogs on a programmed basis.

Apparatus for programmed feeding of hogs has progressed to a highly scientific art in which the hogs have been raised to full size adults as rapidly as possible and with a minimum amount of food commensurate with proper weight gain of the animals. One such satisfactory apparatus is shown in U.S. Pat. No. 4,401,057. In this apparatus the system includes a plurality of feeders and a conveyor for delivering feed to each feeder. Each feeder comprises a fixed pan and a superstructure projecting upwardly from the pan. Extending upwardly from the pan is a rotatable threaded shaft, and a rotary gate is journaled over the pan and is threaded onto the shaft. Normally, the rotary gate simply turns within the pan to agitate the feed being consumed. However, when a latch is depressed, the threaded shaft is immobilized. Rotation of the gate about the immobilized shaft serves to raise and lower the gate relative of the pan, and this relative motion adjusts the opening of at least one feed gate between the rotary gate and the pan for controlled dispensing of the feed.

When using programmed methods of feeding hogs, it is desirable to have feed apparatus which can quickly and inexpensively deliver the required amounts of feed. In addition to cost criteria, the apparatus must be rugged and durable in order to make the investment by the hog raiser economical.

OBJECTS AND SUMMARY OF THE INVENTION

An object of this invention is to provide a hog feeding apparatus which embodies a simplified design as compared to prior art units, and thus reduces the cost of the apparatus to considerable extent.

A further object of this invention is to provide an apparatus of the type stated in which the operating mechanism is positive and reliable despite heavy use of the apparatus for prolonged periods of time.

A still further object of this invention is to provide an apparatus of the type stated which substantially eliminates caking of feed at the point where the feed is available to the hogs.

In accordance with the foregoing objects, the invention may be considered as a feeder for hogs and the like comprising a fixed feeding pan, an overhead generally horizontal conveyor above the pan for transporting feed to said pan, a structure extending substantially from said pan toward said conveyor and including means in communication with said horizontal conveyor and the said pan, said means constituting a drop tube for providing a downward feed flow path between said conveyor and said pan, an auger rotatable in said drop tube for delivery of the feed downwardly through the tube, and auger-operating means attached to said auger at its lower end and proximate to said pan for engagement by the animals being fed for turning said auger and thereby delivering feed to said pan. Thus, the feed is delivered from the drop tube in a controlled fashion and gates or other valve-like components are eliminated.

The augers in the drop tubes and the overhead conveyors are preferably centerless augers as these units tend to avoid "bridging" of the feed. The auger operating means is at the lower end of the drop tube auger and is also in the feed pan. The auger operating means preferably comprises circumferentially disposed elements that form part of a star wheel in fixed relation to the drop tube auger and which elements project radially from the center line of that auger. Thus, the feed flows freely through the auger in the drop tube as its auger is turned by the hogs during the feeding intervals.

In another aspect of the invention the feeding apparatus for hogs and the like comprises an overhead conveyor having an input, a plurality of drop tubes extending downwardly from said conveyor at spaced regions along the length of the conveyor, a feed pan at the lower end of each drop tube, an auger in each drop tube for controlling delivery of feed from the conveyor to the associated feed pan, the location of said drop tubes being such that they are successively remote from the input to the overhead conveyor, the drop tube most remote from the input having control means above the pan and below the overhead conveyor and being operable to stop the overhead conveyor when the height of the feed in the most remote drop tube reaches a predetermined level.

BRIEF DESCRIPTION OF THE FIGURES

FIG. 5 is a fragmentary sectional view taken along 5—5 of FIG. 4;

FIG. 6 is an exploded fragmentary perspective view at the lower end of the drop tube and showing the structure thereat together with the feed pan;

DETAILED DESCRIPTION

Figure 1:
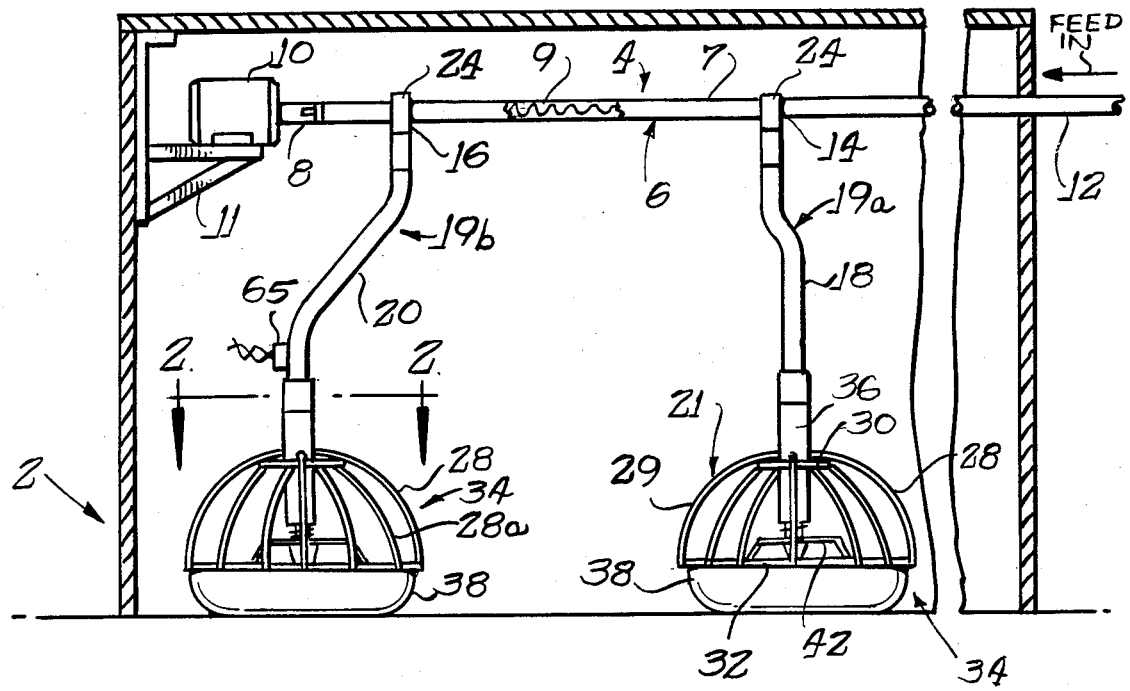
FIG. 1 is a side elevational view, partially in section, of an apparatus constructed in accordance with and embodying the present invention.

Referring in more detail to the drawings, there is shown in somewhat schematic form a hog house 2 within which the feeder 4 is installed. The feeder 4 comprises an overhead generally horizontal auger conveyor 6 that includes an auger tube 7 and a conventional centerless auger 9, the latter being coupled to the drive shaft 8 of an electric drive motor 10. The drive motor 10 is mounted on a conventional support 11 that is located within the hog house 2. The conveyor 6 thus has an input 12, which input is considered as being an input relative to the hog house 2. The end of the conveyor 6 that is to the right (FIG. 1) of the reference numeral 12 and not shown is connected to a source of feed.

Feed is conveyed within the tube of the conveyor 6 along the length of the conveyor past various drop out holes (not shown) and located, for example, at the regions 14, 16 where the feed drops downwardly through the drop out holes and into drop tubes 18, 20. The drop tubes form part of feeder units 19, hereinafter more fully described. Suffice it to say for the present, however, the drop tube 18 is representative of a number of spaced feeder units 19 having drop tubes extending downwardly from the conveyor 6 at spaced regions along the length of the conveyor 6 beginning at a region to the right (FIG. 1) of feeder unit 19. Thus, as seen in FIG. 1, feed conveyed by the conveyor 6 toward the electric motor 10 successively passes the feeder unit drop tubes, reaching the drop tube 20 last. As will be seen hereafter, the last feeder unit 19 at the down stream end of the conveyor may be considered as a control unit in the scheme of operation of the apparatus.

Each drop tube 18 or 20 preferably comprises a coupler 24 for securing the drop tube at its upper end in the region of the downwardly presented drop out hole referred to previously herein. The drop tube is centrally connected to a grill 21 that is formed by a number of rods 28, 29 which define hog feed stations 34 of generally sector shaped geometry. The lower ends of the rods 28 are welded to a base ring 32. Others of the rods 29 are welded at their upper ends to a sleeve 36 while the rods 28, which are intermediate the first mentioned rods 29, are welded to an upper center ring 30. The arrangement is such that the sleeve 36 is substantially central with respect to the grill 21. The sleeve 36 is telescoped over the lower end of the drop tube 18 or 20 and is suitably rigidly affixed thereto and with the lower end of a drop tube auger 40 projecting below the sleeve 36 (See FIGS. 3 and 4).

Figure 2:
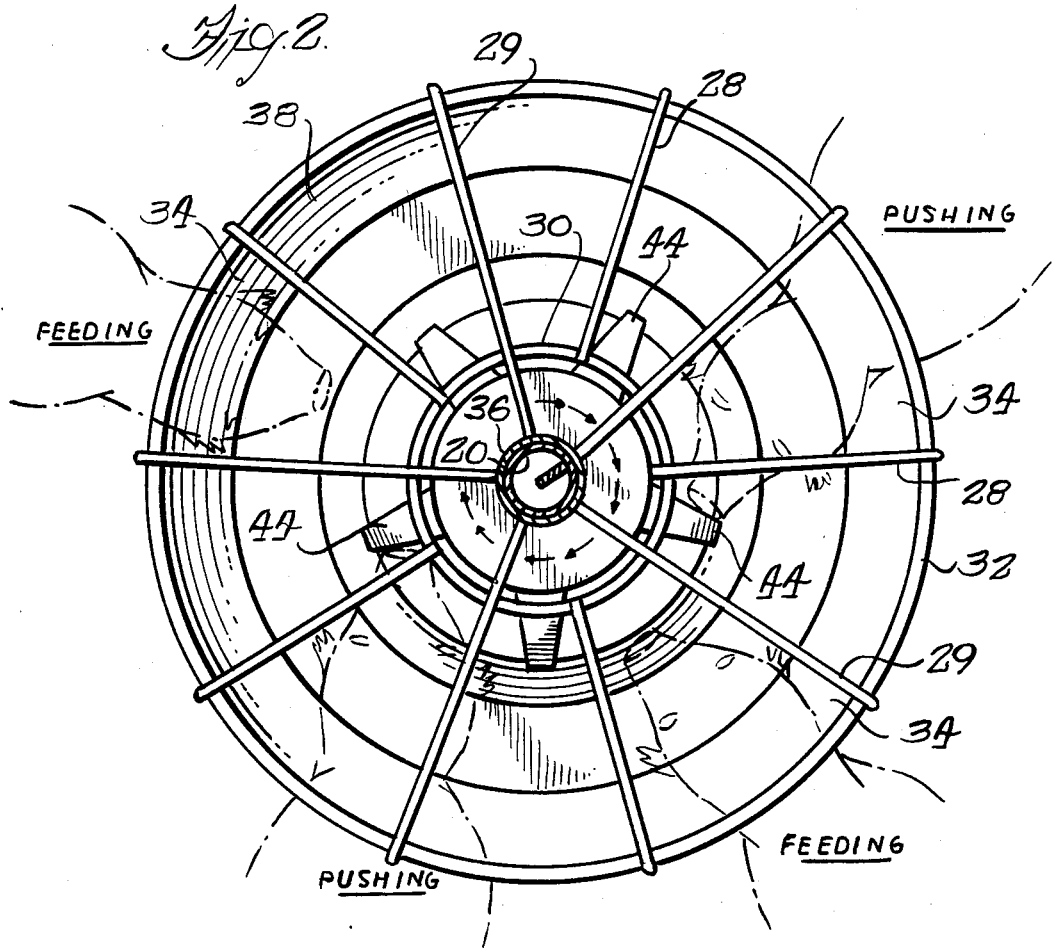
FIG. 2 is a fragmentary sectional view on an enlarged scale taken along line 2—2 of FIG. 1.

The ring 32 rests on a feed pan 38 which is immobile and normally is supported directly upon the floor of the hog house. Consequently, the hogs can enter the feed stations 34 as shown in FIGS. 2 and 3 whereby the hogs can consume feed within the pan 38.

In this embodiment the drop tubes may be straight or they may have one or more bends as shown. In such event the drop tube auger in tube 20 (and similarly in the drop tube 18) is the centerless auger 40 extending upwardly past one or more of the tube bends and adapted, when rotated, in the proper direction (indicated by arrows in FIG. 2) to cause the feed to be positively driven through the drop tube and through the sleeve 36 and into the pan 38.

As previously stated, each of the feeder units 19 spaced along the length of the conveyor 6 is of like construction, the details of which are shown in FIGS. 2 through 5. Therefore, only one such feeder need be described herein. In any case, the lower end of the centerless auger 40 is directly coupled to a star wheel 42. For this purpose the star wheel has a center plate 43 and a center shaft 45 which projects upwardly into and is pinned or otherwise rigidly secured to the auger 40 in any conventional manner. At the outer periphery of the center plate 43 the star wheel includes downwardly and outwardly inclined elements or fingers 44 which project radially relative to the center line of the auger 40, being disposed circumferentially about its center line. The elements 44 are in relatively close overlying relationship with a frusto conical hub 46 which is integrally formed on the feed pan 38 centrally thereof.

Figure 3:
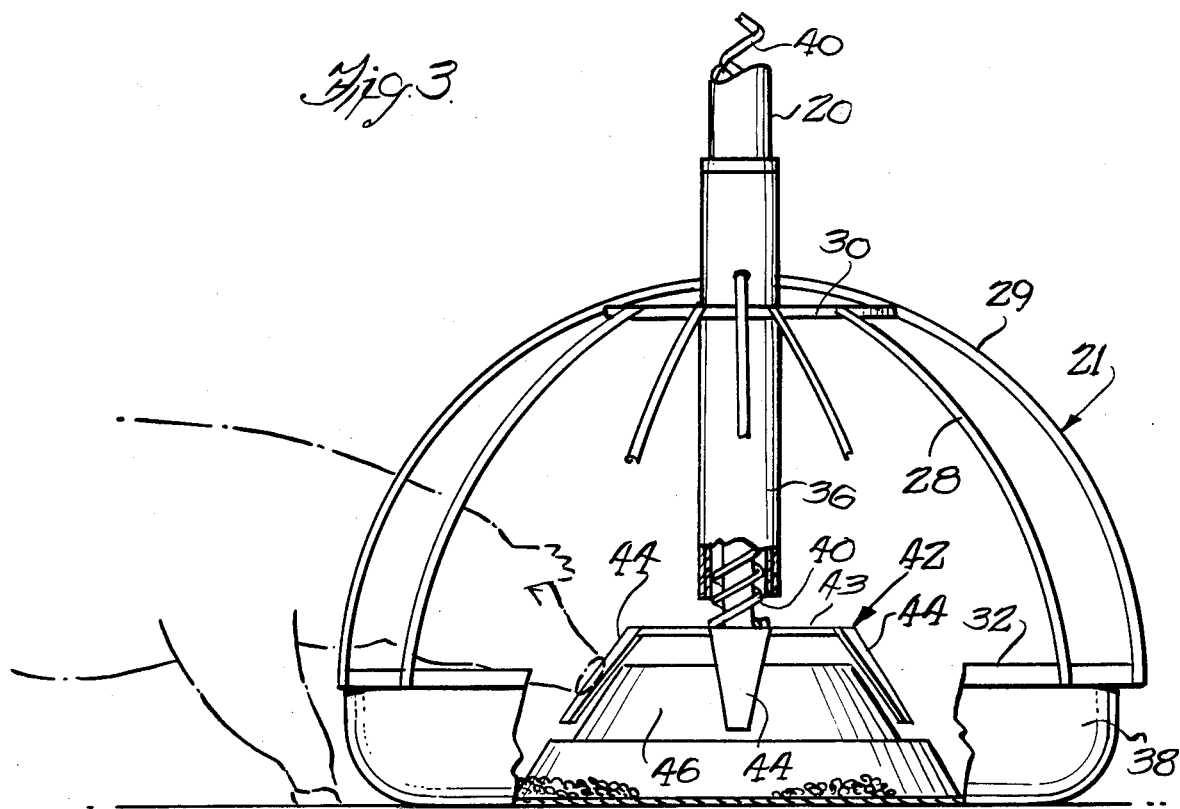
FIG. 3 is an enlarged fragmentary elevational view of the lower end of the drop tube and showing the structure thereof as well as adjacent structure.
Figure 4:
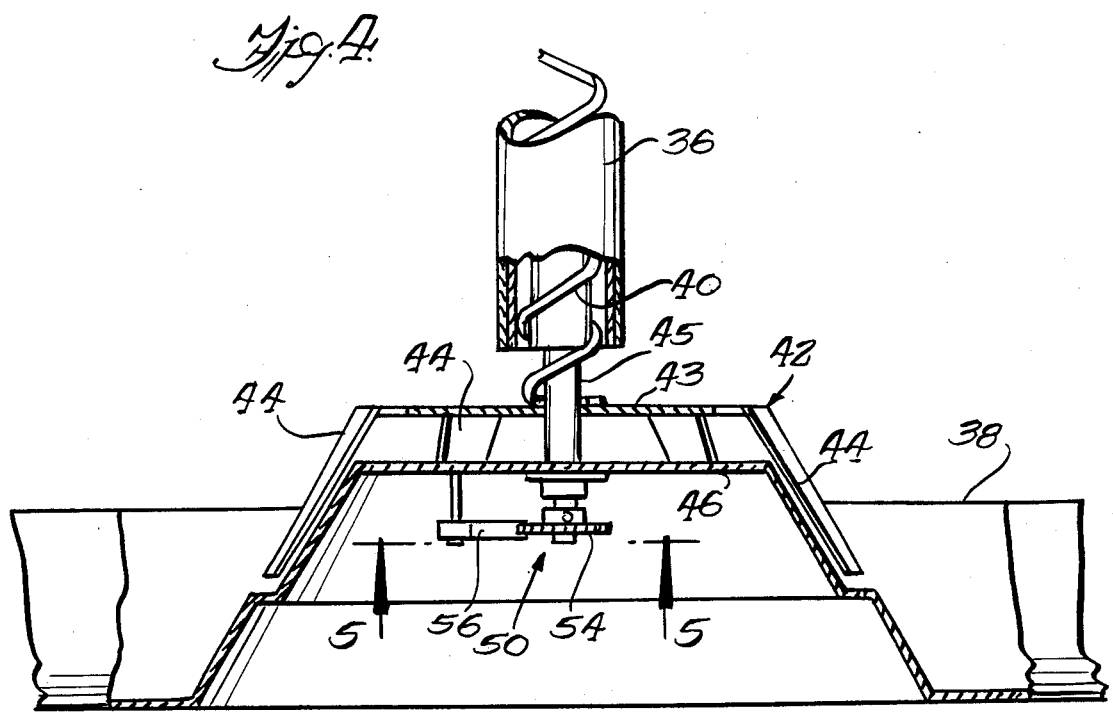
FIG. 4 is a further detailed showing at the lower end of the drop tube.
Figure 7:
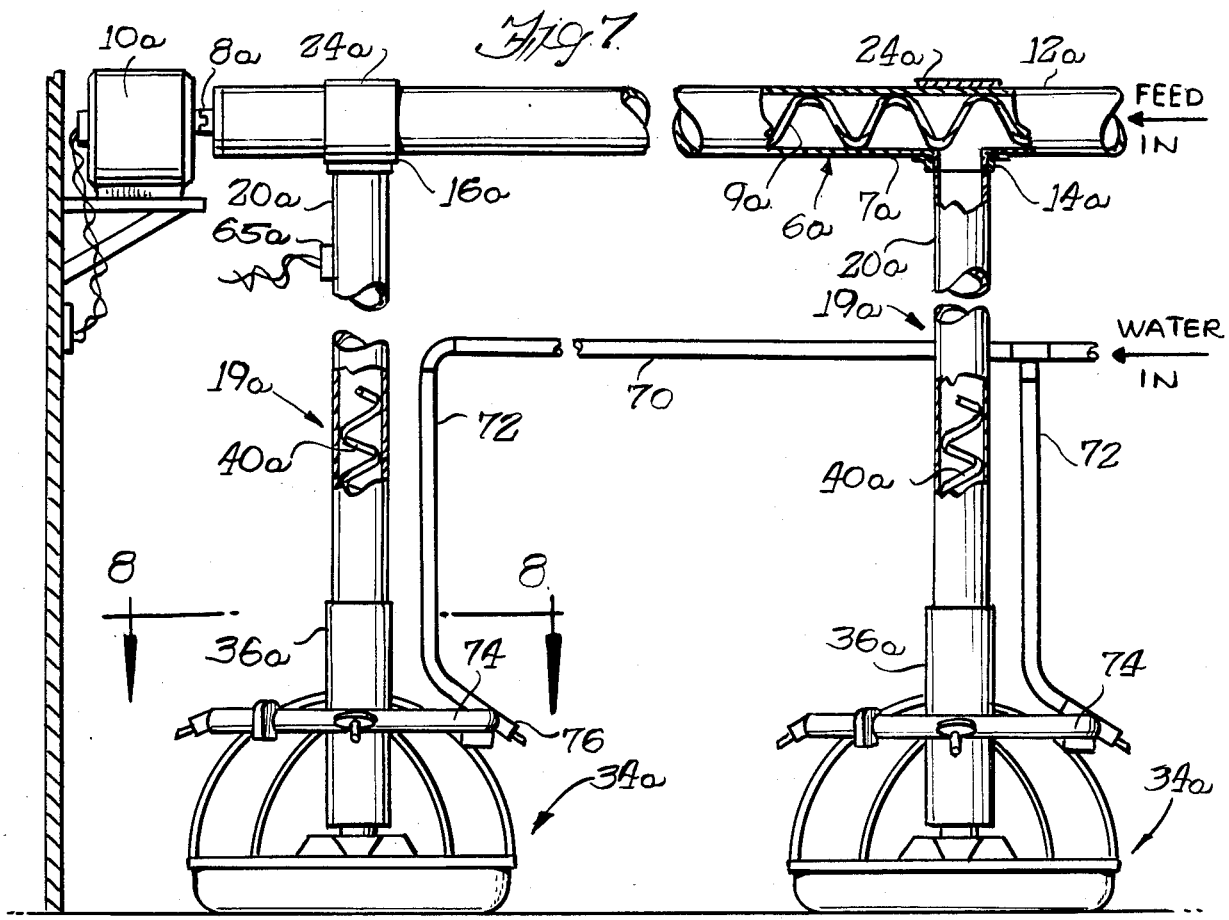
FIG. 7 is a fragmentary elevational view, partially in cross section showing a modified form of the present invention.
Figure 8:
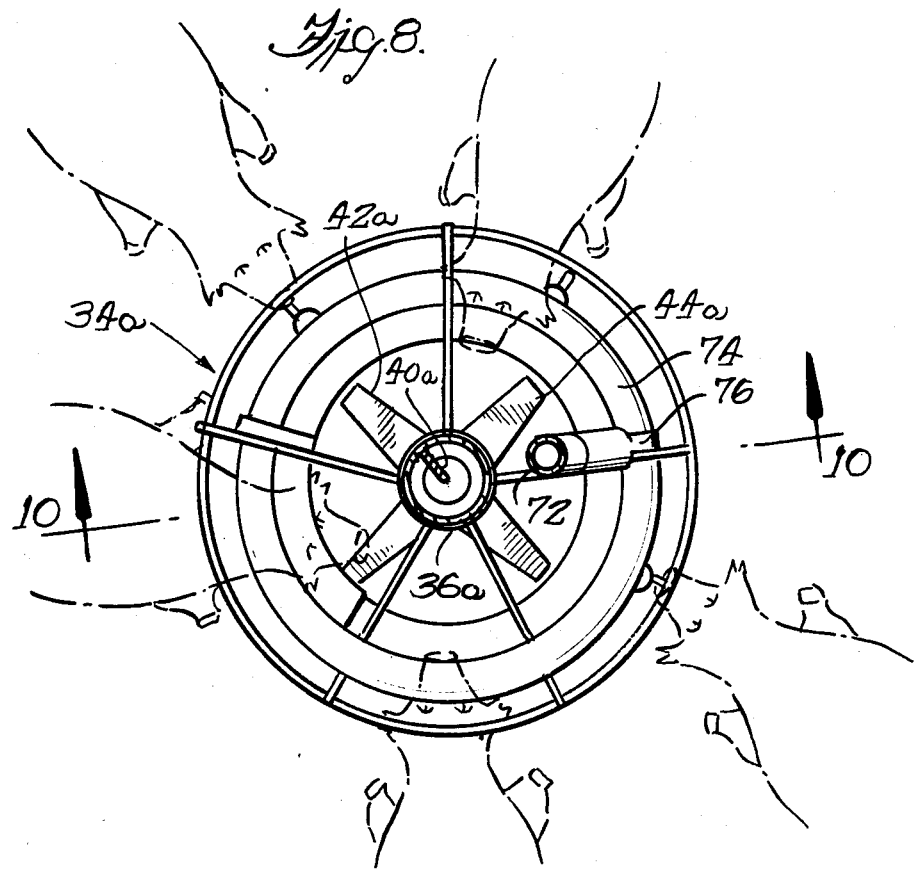
FIG. 8 is a sectional view taken along line 8—8 in FIG. 7.

As shown in FIGS. 3 and 4 the center shaft 45 substantially blocks the center of the lower end of the auger so that the feed must necessarily pass down the helical flight of the auger. In this embodiment provision is made for limiting rotation of the auger 40 in the direction which positively drives the feed downwardly in the drop tube. More specifically, a ratchet mechanism 50 (FIGS. 4 and 5) may be provided. The ratchet mechanism is of conventional design and includes a ratchet wheel 54 coupled to the lower end of the shaft 45 that is beneath the upper surface of the hub 46. The ratchet wheel 54 cooperates with a pawl 56. The pawl 56 is pivoted by a pin 58, and a spring 60 pulls the tip of the pawl 56 into engagement with the ratchet wheel 54.

In use, the motor 10 is turned on to convey feed to the conveyor 6 and to the drop tubes 18, 20 of the feeder units. The drop tube 18 fills first as do successive drop tubes along the length of the conveyor 6. The last drop tube to fill is the tube 20 forming part of the control feature of the present apparatus. Assuming all the drop tubes are filled and the hogs begin feeding, they will enter the feed stations 34 for access to the feed. The body motion of the animals will engage the elements 44 causing the respective augers 40 in the drop tubes to rotate and thereby positively drive and deliver the feed to the respective feed pans 26.

As the feed is being consumed it will, generally speaking, result in the feed in the drop tube 20 of the control feeder being depleted first because of the fact that this feeder unit is most remote from the intake of the conveyor 6 and is the last to fill and the conveyor is controlled to stop before the tube is completely filled. Specifically, a limit switch 65 is disposed in the drop tube 20 somewhat above the pan 38 but also somewhat below the height of the horizontal conveyor 6. This limit switch controls the operation of the motor 10. In a typical arrangement, the limit switch 65 may be about five feet above the floor upon which the feed pans rest whereas the overall height from the floor to the conveyor 6 is about seven feet. When the supply of feed in the drop tube 20 drops below the level of the sensor or control switch 65, the electric motor 10 will be turned on to start the conveyor 6 operating and deliver more feed to the respective feeders. When the drop tube 20 is finally filled to the level of the switch 65 the motor 10 will stop. The foregoing arrangement assures that there is always feed in the various drop tubes along the length of the conveyor 6.

Referring now to FIGS. 7, 8, 9 and 10, there is shown another embodiment of the present invention which is similar to the structure described above as indicated by the application and the same reference numerals with the suffix a added to the same elements. The structure of this embodiment is more economical and relatively simple as compared with the previously described embodiment. More specifically, the drop tube 20a of each feeder unit or assembly 19a is preferably substantially vertically disposed and substantially straight as shown so that there are no bends or generally horizontal portions which might cause bridging of the feed. Furthermore, the centerless auger 40a of each feeder unit is relatively short and may, for example, extend for only a foot or two above the feeder pan. The auger 40a is secured to a stub shaft 45a having a lower end portion rotatably supported in a bearing block 60 secured to the underside of the frusto conical central portion 46a of the feeder pan 38a. As shown best in FIG. 10, the upper end portion of the stub shaft 45a has a diameter which substantially fills or plugs the otherwise open center of the lower end portion of the auger 40a.

With the previously described structure, the auger 40a and the stub shaft or plug 45a serve to restrict the lower end of the drop tube and complimentary sleeve 36a so that the feed can flow from the drop tube into the pan only along the helical path provided by the flight of the auger. As pointed out above, in this embodiment the auger 40a extends only a relatively short distance above the pan so as to restrict the downward flow of feed in the drop tube only for a sufficient distance to maintain control of the feed flow while at the same time providing for agitation of the feed to a sufficient height above the feed pan to minimize any possibility of the feed bridging within the drop tube. With this arrangement, it has been found that feed may be effectively dispensed from the drop tube by rotating the auger in either direction an amount simply sufficient to loosen the feed at the lower end and permit it to flow by gravity down the helical flight of the auger. Thus in this embodiment, the previously described ratchet mechanism for limiting rotation of the auger to a single direction has been eliminated.

Figure 9:
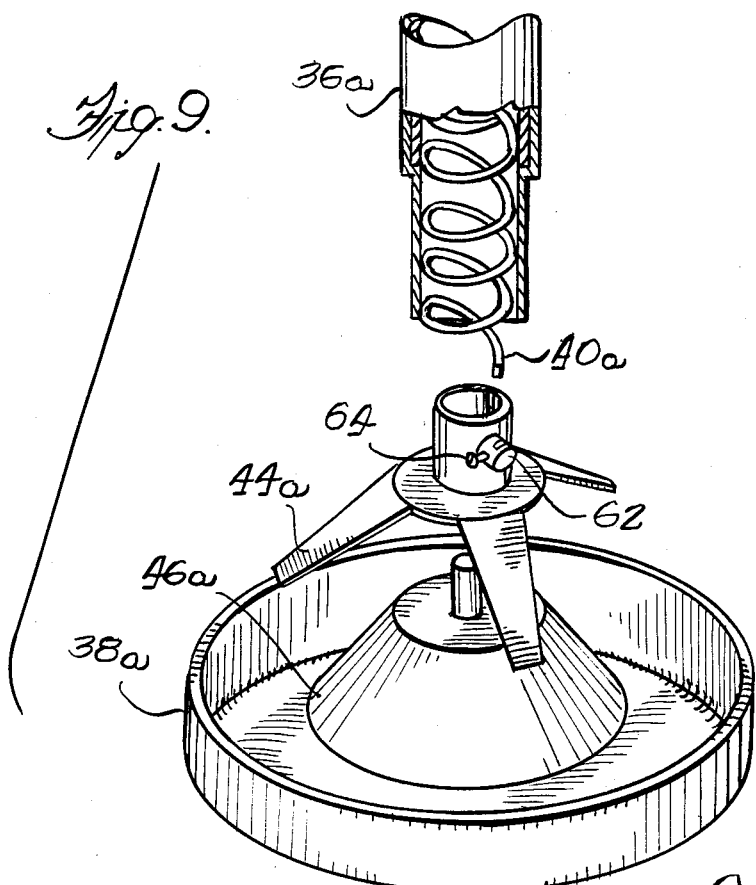
FIG. 9 is an exploded fragmentary perspective view of a lower end portion of the FIG. 7 embodiment.
Figure 10:
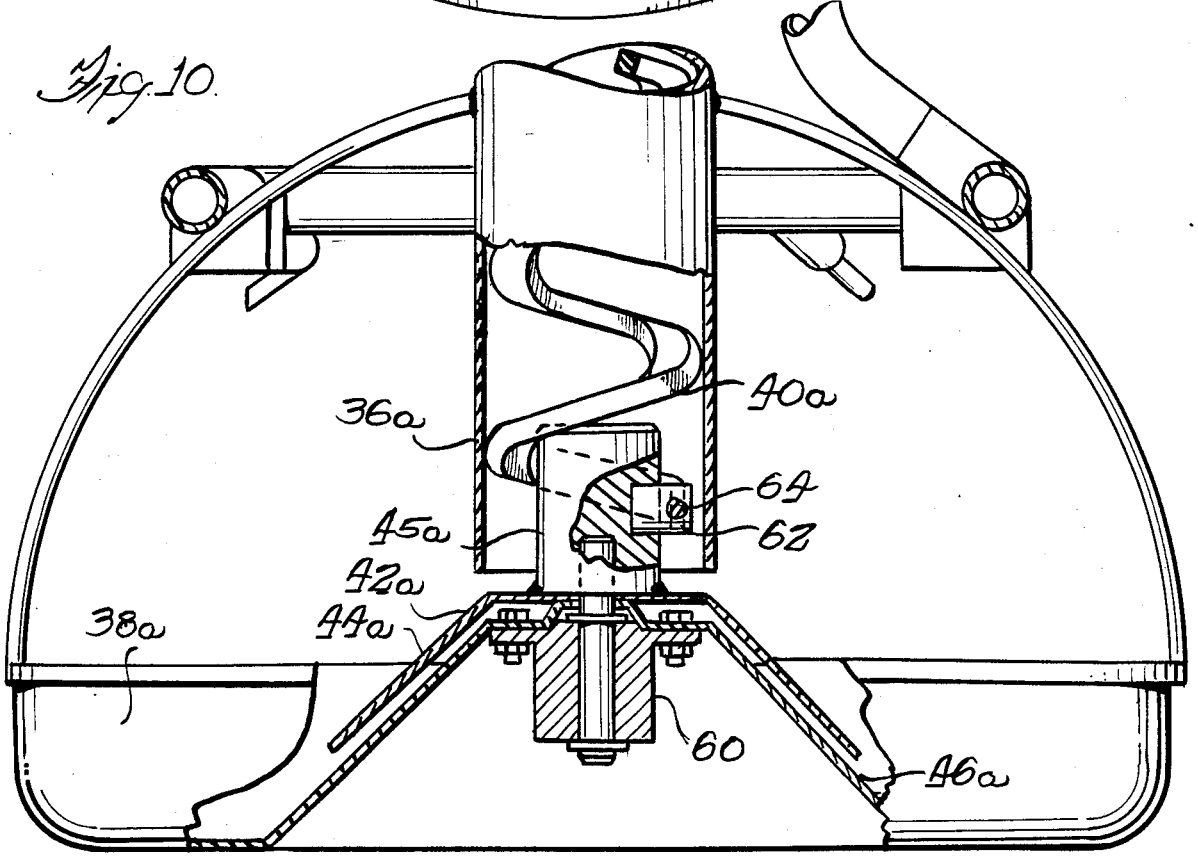
FIG. 10 is a partial sectional view taken along line 10—10 in FIG. 9.

As shown in FIGS. 9 and 10, a slotted lug 62 is welded or otherwise secured to the side of the stub shaft 45a for receiving a lower end of the auger 40a and securing the auger with respect to the stub shaft. A set screw 64 is provided for releasably securing the auger to the lug. It is noted that the lug extends generally horizontally and will wipe through an arc substantially traversing the lower end of the drop tube so as to aid in breaking up any feed which may tend to cake or bridge thereby assuring free flow of the feed.

With the structure just described, every time a feeding pig contacts one of the fingers or elements 44a of the star wheel 42a so as to rotate or agitate the auger 40a, a certain amount of feed will flow from the drop tube regardless of the direction in which the auger turns. Thus, as long as there is feed in the drop tube, the amount of feed dispensed depends primarily on the amount of agitation imparted to the auger by the feeding animals. It has been found that baby or very young animals may agitate the auger almost as much as larger animals so as to cause dispensing of the feed even though such smaller animals do not require as much feed to eat at any given time. In order to slow down or control the rate at which feed is dispensed during any given agitation or rotation of the auger, the pitch of the auger helix is preferably varied in accordance with the size or feeding capacity of the animals to be fed. For example, feeder units intended to be used by baby or small pigs are provided with augers 40a having a relatively small helical pitch for reducing the controlled rate at which feed is dispensed while feeder units for larger or adult animals may be provided with augers 40a having a larger helical pitch for permitting controlled dispensing of the feed at an increased rate.

In the embodiment of FIGS. 7–10, the feeder apparatus is further shown in combination with a watering system including a main supply line 70, and branch lines 72 which extend to annular manifolds 74 disposed adjacent the top of the grills of each of the feeder pan assemblies. A plurality of animal operated nipple type watering outlets 76 is associated with each of the manifolds so as to present water to the animals at a location above the feeder pan in much the same manner as described in the above mentioned U.S. Pat. No. 4,401,057.

While preferred embodiments of the present invention have been shown and described herein, it is obvious that many structural details may be changed without departing from the spirit and scope of the appended claims.

The invention is claimed as follows:

1. A feeder for hogs and like animals comprising: a feeding pan; an overhead generally horizontal conveyor above the pan for transporting feed toward said pan; a feed delivery structure extending substantially from said pan toward said conveyor and including drop tube means and means for mounting said drop tube means in communication with said horizontal conveyor and with said pan for providing a downward feed flow path between said conveyor and said pan, an auger rotatably mounted within said drop tube means for controlling delivery of the feed downwardly therethrough, and auger-operating means attached to said auger at its lower end and proximate to said pan for engagement by the animals being fed for turning said auger and thereby delivering feed to said pan.

2. A feeder according to claim 1 in combination with driving means for operating said horizontal conveyor, and control means on said tube intermediate the horizontal conveyor and the lower end of said drop tube for activating said driving means when the level of feed in said drop tube drops to a predetermined level.

3. A feeder according to claim 1 in which said auger is a centerless auger.

4. A feeder according to claim 3 which includes means substantially plugging at least a lower internal center end portion of said centerless auger for substantially confining the downward movement of feed to areas along helical flights of the auger.

5. A feeder according to claim 2 in which said auger-operating means are formed by a series of elements projecting from said auger.

6. A feeder according to claim 2 including ratchet means in operative connection with the auger for limiting the auger to rotation in only one direction.

7. A feeder according to claim 1 in which said auger-operating means comprises a series of elements attached in fixed relation to said auger and projecting radially outwardly from the center line of aid auger, and being circumferentially disposed about said center line.

8. A feeder according to claim 7 in which said elements extend to areas within the confines of said pan, said elements being mounted on a shaft that is concentric with said auger and affixed thereto.

9. In a feeding apparatus for animals such as hogs and the like having an overhead feed conveyor means and a drop tube coupled with and extending downwardly from said conveyor, the combination comprising a feed pan connected with a lower end of the drop tube, an elongate auger, means for rotatably mounting said auger to said feed pan for extending upwardly into said drop tube for controlling delivery of feed from the conveyor to the associated feed pan, and animal operable means connected with said auger and extending over said pan beneath the drop tube for rotating the auger and thereby controlling advancement of feed from the drop tube into the pan when said animal operable means is engaged and operated by an animal during feeding.

10. Feeding apparatus according to claim 9 in which said auger is a centerless auger, and further including means substantially plugging a lower internal central portion of said centerless auger for substantially confining the downward movement of feed to areas along helical flights of said aguer.

11. Feeding apparatus according to claim 10, said animal operable means comprising radially extending means positioned for engagement by the head of a feeding animal for urging the auger for rotation.

12. Feeding apparatus according to claim 11, which includes ratchet means for preventing rotation of the auger in one direction.

* * * * *